United States Patent [19]
Kiritz

[11] Patent Number: 5,991,745
[45] Date of Patent: Nov. 23, 1999

[54] REVERSE MORTGAGE LOAN CALCULATION SYSTEM AND PROCESS

[75] Inventor: Nicholas Kiritz, Silver Spring, Md.

[73] Assignee: FannieMae, Washington, D.C.

[21] Appl. No.: 08/787,426

[22] Filed: Jan. 22, 1997

[51] Int. Cl.⁶ .......................... G06F 157/00; G06F 17/60
[52] U.S. Cl. ................................. 705/38; 705/1; 705/38; 705/35; 395/238; 395/236
[58] Field of Search .................................. 705/38, 1, 35; 395/238, 236

[56] References Cited

U.S. PATENT DOCUMENTS

| | | | |
|---|---|---|---|
| 4,876,648 | 10/1989 | Lloyd ......................................... | 705/38 |
| 5,083,270 | 1/1992 | Gross et al. .............................. | 705/35 |
| 5,673,402 | 9/1997 | Ryan et al. ................................ | 705/38 |
| 5,689,649 | 11/1997 | Altman et al. ............................ | 705/38 |
| 5,878,404 | 3/1999 | Stout, Jr. et al. ........................ | 705/38 |

OTHER PUBLICATIONS

New York State Banking Department, Reverse Mortgage Loan, http://www.banking.state.ny.us/rml.htm, Aug. 1996.
James R. DeBoth, A reverse mortgage can offer a source of income during retirement years, http://www.interest.com/sa960807.htm, 1995.
AgeNet, Reverse Mortgages, http://www.agenet.com/reverse_mortgages.html, 1997.

*Primary Examiner*—James P. Trammell
*Assistant Examiner*—Nga B. Nguyen
*Attorney, Agent, or Firm*—Kramer Levin Naftalis & Frankel LLP

[57] ABSTRACT

A system and process of calculating monetary payments by a lender to a borrower based on the value of an asset using at least one of a plurality of constants stored in look-up tables. The process includes inputting borrower information such as borrower birthdate or age. Property specific information is input, such as appraised property value. Equity share information is also input. With the Equity share information and borrower age, the process looks-up a tenure conversion factor from a look-up table. The loan type is input as one of tenure, line of credit, and modified tenure and appropriate variables are set accordingly. The principal limit factor is read from a look-up table and the original principal limit is calculated to be equal to the principal limit factor multiplied by the appraised property value. Next the net principal limit is calculated as the original principal limit minus costs. The loan is then calculated—if tenure, then the monthly payment equals net principal limit times tenure conversion factor, if line of credit, then the net principal limit equals the line of credit, and if modified tenure, then net line of credit equals net principal limit minus (monthly payment divided by tenure conversion factor), when a monthly payment amount was requested or monthly payment equals (net principal limit minus net line of credit) multiplied by tenure conversion factor when a net line of credit was requested.

50 Claims, 8 Drawing Sheets

|  | 401 | 406 |
|---|---|---|
|  | 404 ORIGINAL | COMPARISON |
| BORROWER ID | BONNIE2 | 402 |
| ESTIMATED LOAN DATE/STATE | 01/01/95 CA |  |
| BORROWER'S/COBORROWER'S BIRTH | 01/01/20  75 | / /  412 |
| APPRAISED/ADJUSTED PROP VALUE | 100,000 | 100,000  410 |
| SERVICING FEE/EQUITY SHARE | 30.00 | Y  416 |
| TENURE CONV. FACTOR | 0.008920 |  |
| PRINCIPAL LIMIT FACTOR | 0.57900 |  |
| ORIG. PRINCIPAL LIMIT | 420 | 57,900.00 |
| SERVICING FEE ALLOCATION | 414 | 3,363.23  422 |
| ORIG. FEE/OTHER CLOSING COSTS | 2,000.00 | 1,500.00 |
| LIEN ADVANCES/OTHER DRAWS | , . | , . |
| REPAIRS SET-ASIDE | | , . |
| POINTS | | 1,000.00 |
| 1ST YEAR PROP. CHARGES | | , . |
| NET PRINCIPAL LIMIT | | 50,036.77 |
| PAYMENT PLAN | 2 TENURE | |
| NET LINE OF CREDIT | | 0.00 |
| MONTHLY PAYMENT | | 446.33 |

FIG. 4

[ FACTOR TABLE ]
54,0.04743,0.06700,0.08045,0.06938
55,0.06797,0.09515,0.03488,0.03957
56,0.08832,0.11000,0.02157,0.03173

*FIG. 5*

[ ESA ]
62,62,57
62,63,57
62,64,58
62,65,58
62,66,58

*FIG. 6*

AZ,203150,ARIZONA
CA,203150,CALIFORNIA
CO,203150,COLORADO
CT,203150,CONNECTICUT
DC,203150,DISTRICT OF COLUMBIA
DE,203150,DELAWARE
FL,203150,FLORIDA

*FIG. 7*

REVERSE MORTGAGE LOAN CALCULATION SYSTEM AND PROCESS

BACKGROUND OF THE INVENTION

This invention is directed generally to loan calculation system, and, in particular, to a reverse mortgage loan calculation system and method using look-up tables.

Mortgage products have taken many forms in the prior art. Among the popular types of mortgage products are a conventional mortgage where an individual receives money in exchange for a mortgage, which includes a promissory note to the lender, as well as providing the lender with a security interest in the underlying collateral. In most cases, the individual's home is the primary collateral.

A home equity loan is an additional type of collateralized loan. The home equity loan or home equity line of credit normally provides an individual with the ability to obtain additional capital, while again providing a promissory note and a second security interest in the underlying collateral. In each case, the owner of the asset enjoys the asset while a security interest in the asset is given to a lender.

U.S. Pat. No. 5,083,270 is directed to a method and apparatus for releasing the value of an asset. The program provides for an interest-free mortgage to be taken against a secured asset for a promissory obligation by a participant to pay a sum certain on death of the participant. This system is developed as a fund which derives income from a payment of obligations as participants die, thereby funding distributions to other participants that are living. Eligibility into the system is determined based on the value of pledged assets with respect to the amount against which they are pledged.

Thus, it is known to loan money to an individual so that the borrower can obtain money from an asset that the owner still enjoys during his/her life, but at death, the asset is turned over to the loan provider.

It is desirable to provide a loan calculation system and method which allows a loan officer in a financial institution to change many different variables required in considering whether to lend money, so that a customized loan may be provided. In particular, an individual can obtain upfront income, line of credit income, or tenure payments, and upon entry of certain fixed information, the loan officer may vary a plurality of variables to provide the desired customized loan structure.

SUMMARY OF THE INVENTION

Generally speaking, in accordance with the instant invention, a reverse mortgage loan calculation system and process is provided. A reverse mortgage loan calculation system and method in accordance with the present invention is provided to be carried out by a lender, bank or other mortgage provider using a conventional personal computer or the like. Furthermore, the loan calculation system and process does not need to conduct highly complex calculations and software used as part of the system and method can be effectively run on a personal computer having even an Intel 286 microprocessor or greater. The personal computer must be connected to an input device, such as a keyboard and a monitor for viewing the data. The program software is run on the processor, and must access database records generated by the user, as well as a plurality of look-up tables.

The proprietary method and system of the current invention is designed to calculate monetary payments by a lender to a borrower based on the value of an asset, a plurality of constants stored in look-up tables, and borrower information, such as borrower(s) age(s). The method is designed to allow a borrower to enjoy the value of assets accumulated during life, and the asset itself, such that upon death, the asset owner/borrower may have little or no value left in the asset, and the asset may be turned over to the lender. In any event, it is the borrower(s) choice or their heir(s) choice whether to pay off the loan or turn the asset over to the lender. The process comprises the steps of inputting borrower specific information and asset specific information. In particular, where there are co-borrowers, the process must look up an equivalent single age of the borrowers on a look-up table. The process then looks up the tenure conversion factor from a second look-up table. The tenure conversion factor is described in more detail below.

The desired type of loan must be input as either tenure, line of credit or modified tenure. The process then automatically sets parameters based on that input, such as if tenure, then net line of credit equals zero; if line of credit, then monthly payment equals zero; and if modified tenure, then the borrower must set a dollar amount of either the net line of credit or monthly payment desired. The process then looks up the principal limit factor and calculates the original principal limit which equals principal limit factor multiplied by appraised property value. The net principal limit is then calculated as the original principal limit minus all costs, such as origination fees, closing costs, lien advances, repair set asides, etc. Finally, the loan value is calculated depending upon which type of loan is applied for.

If a tenure loan is applied for, then the monthly payment equals the net principal limit times the tenure conversion factor. If a line of credit is applied for, then the net principal limit is equal to the net line of credit. In a modified tenure loan, if the borrower wants a specific monthly payment, then net line of credit equals the net principal limit minus (monthly payment divided by tenure conversion factor). Alternatively, if a specific net line of credit is requested, then the monthly payment equals (net principal limit minus net line of credit) multiplied by tenure conversion factor. In either case, if the net line of credit or monthly payment is negative, an error will be noted.

Accordingly, it is an object of the invention to provide an improved reverse mortgage loan calculation system and method.

A further object of the invention is to provide a system, method and product that looks up predefined factors so that the calculations required are simpler and the hardware requirements are significantly decreased.

A still further object of the invention is to provide a system and method using loan calculation software that is easily manipulated, so that a loan officer when working with a borrower may change any one of the input factors, and can recalculate all the figures in an instant, to provide a customized loan as desired by the borrower.

Still other objects and advantages of the invention will in part be obvious and will in part be apparent from the specification and drawings.

The invention accordingly comprises the several steps and the relation of one or more of such steps with respect to each of the others thereof, which will be exemplified in the process and a system for performing the steps hereinafter disclosed, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 4 is an exemplary screen display for the present invention;

FIG. 5 is an exemplary Factor look-up table;

FIG. 6 is an exemplary Equivalent Single Age look-up table; and

FIG. 7 is an exemplary Government Sponsored Enterprise Limit look-up table.

DETAILED DESCRIPTION OF THE PREFERRED EMBODIMENTS

Figure 1:
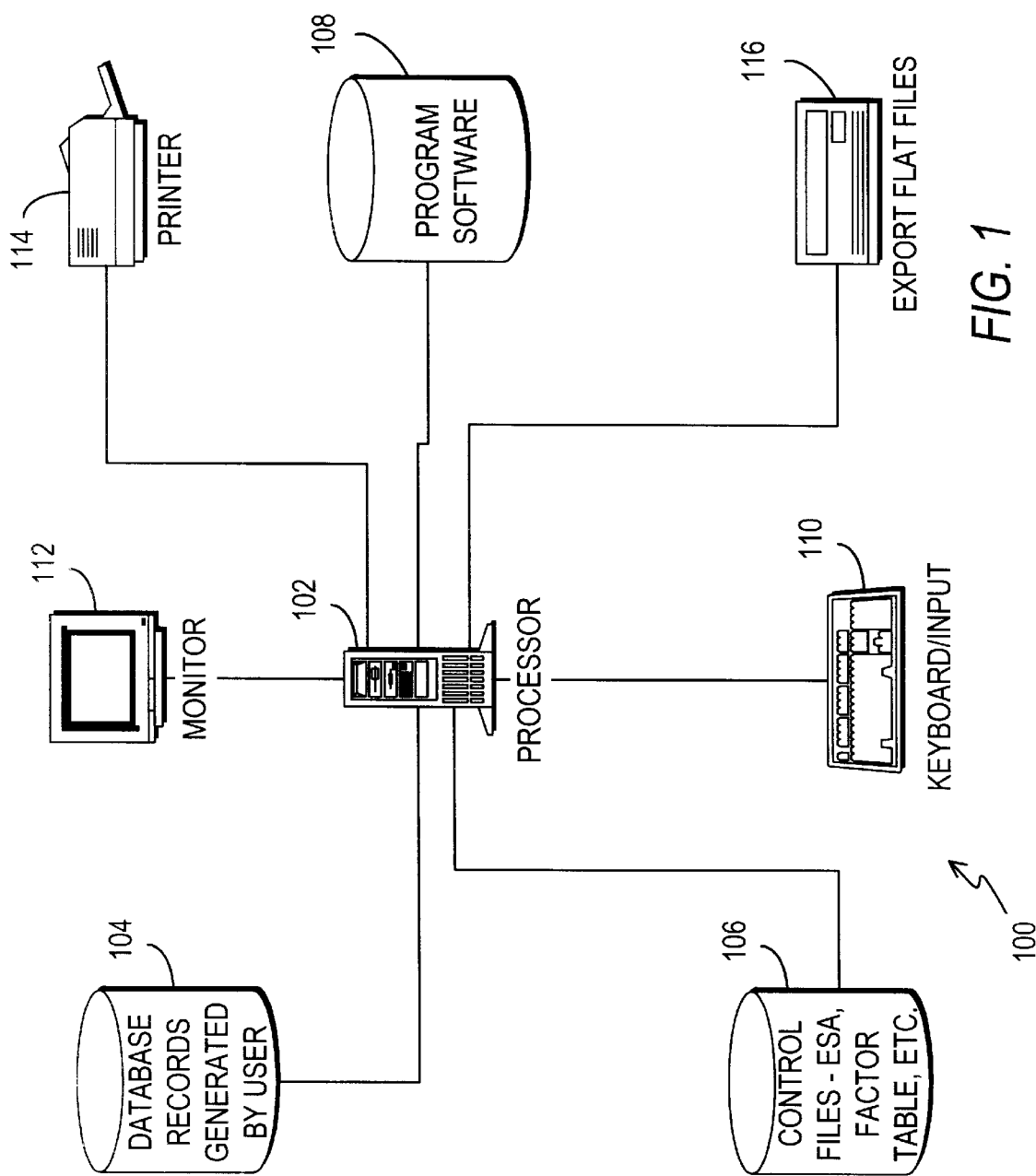
FIG. 1 is a block diagram of the system components of the system for carrying out the process of the instant invention.

Reference is first made to FIG. 1, wherein a block diagram of a reverse mortgage loan calculation system, generally indicated as 100, made in accordance with the invention, is depicted. System 100 includes a processor 102 coupled to database records generated by a user 104 and control files also known as look-up tables 106 which are described in more detail below. Processor 102 accesses program software 108 to conduct the process described in more detail in connection with FIGS. 2A–2C and 3A–3B. A loan officer or other individual at a lending institution inputs borrower data at a keyboard or input device 110, and creates database records 104. As the information is input, it is displayed on a monitor 112. Processor 102 then outputs either a printed record at printer 114 or a flat file through output device 116.

Figure 2A:
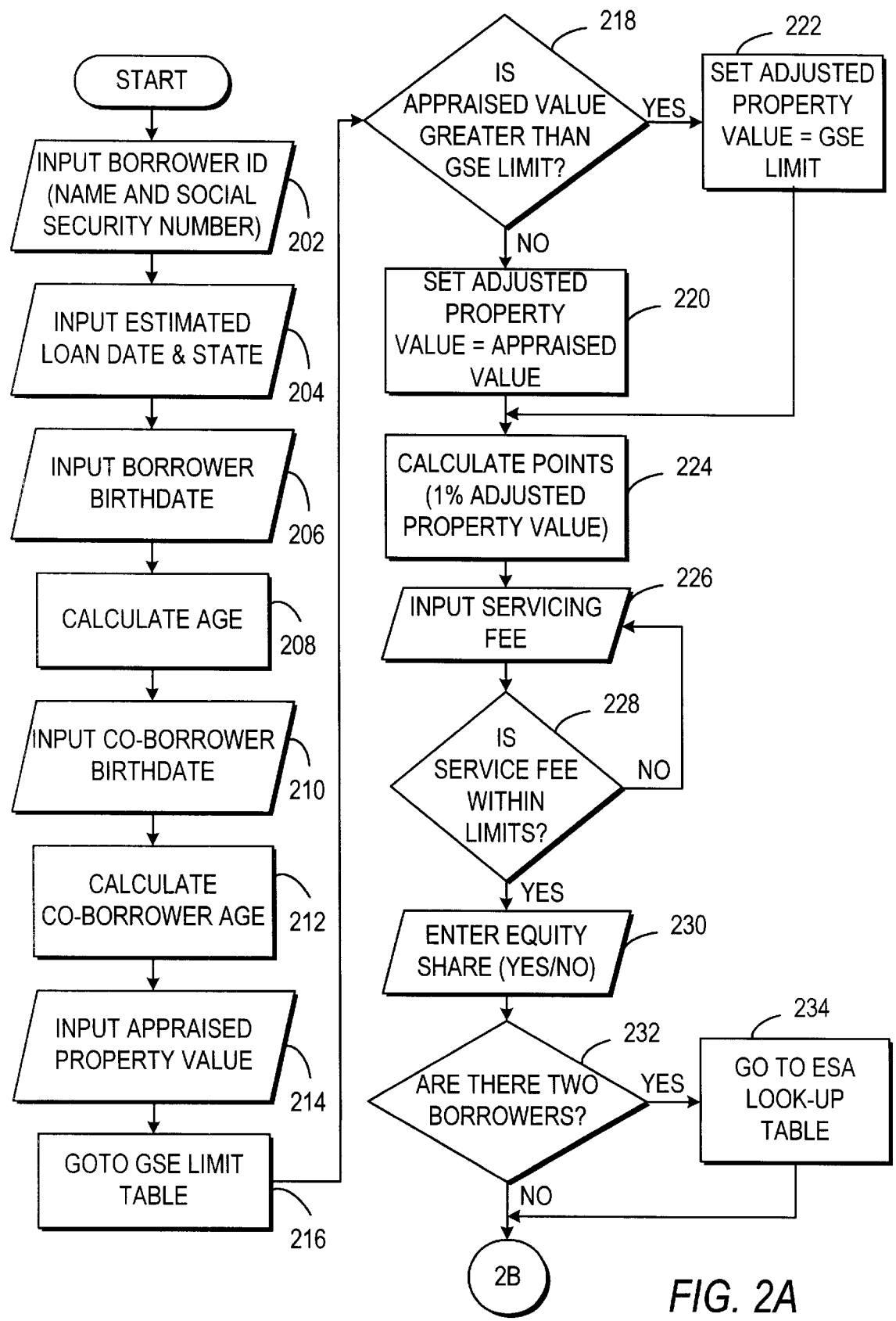
FIG. 2A–2C is an overview flowchart of the process of the present invention.
Figure 2B:
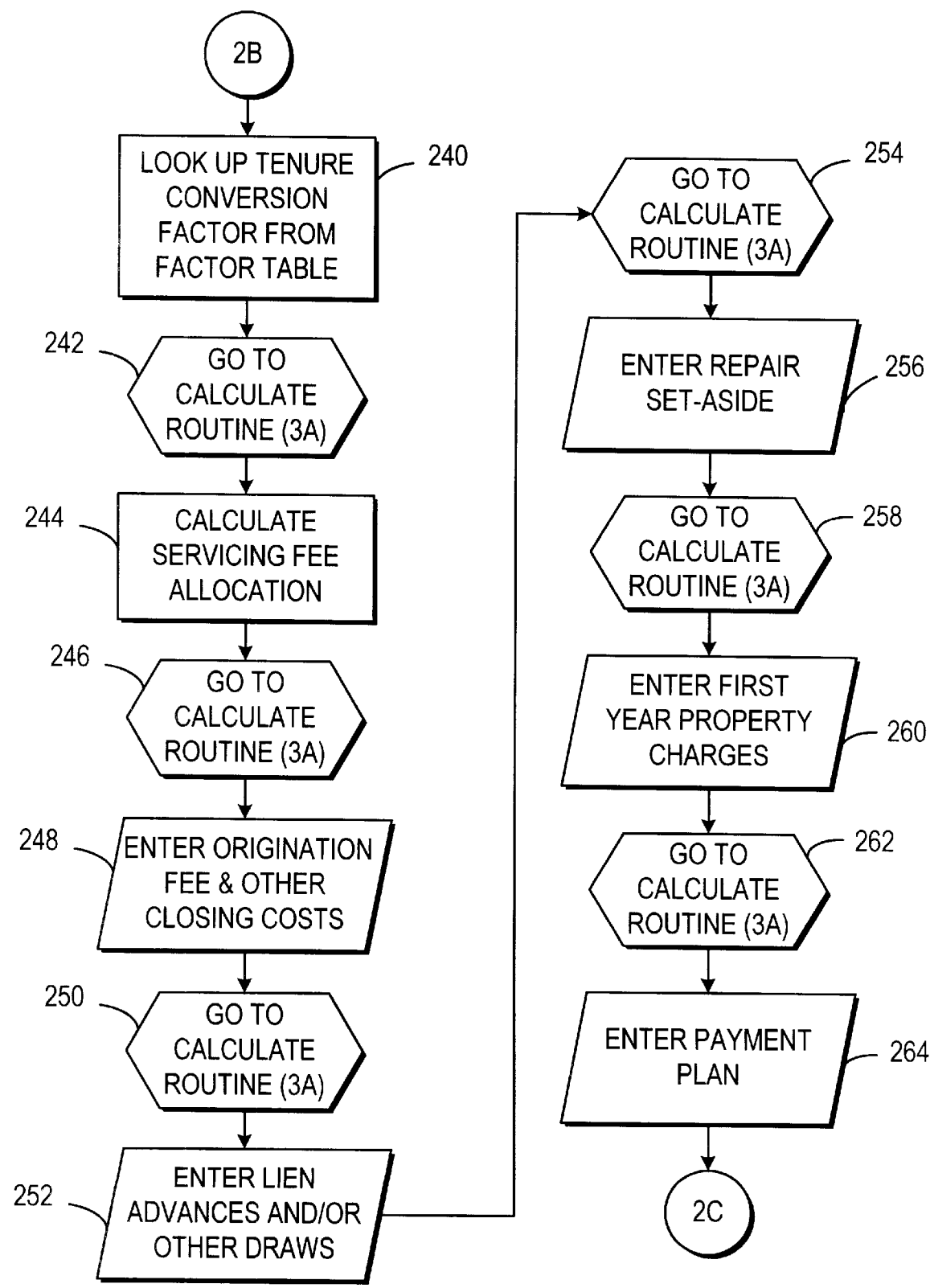
Figure 2C:
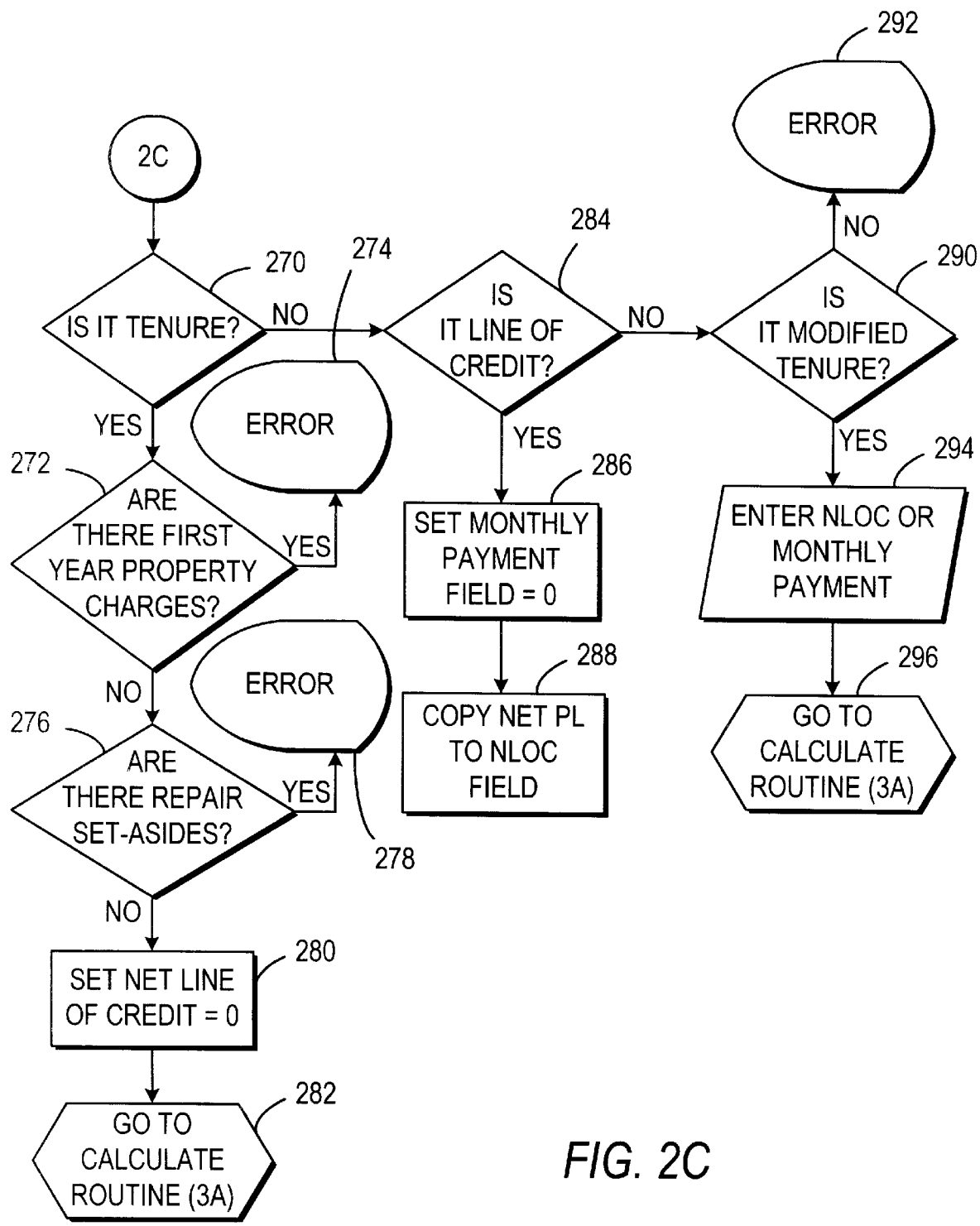

Reference is next made to FIGS. 2A–2C which illustrate the flow of information carried out by processor 102 of FIG. 1. First, at block 202 the loan officer inputs borrower identification, such as name, social security number, address, etc. The process then continues to block 204 where the loan officer inputs the estimated loan date and state where loan is being provided. The process then continues at block 206 where the borrower's birthdate is entered. The process then calculates the borrower's age at block 208. The age calculation is performed by subtracting the estimated loan date from the borrower's birthdate and rounding to the nearest year. For example, a borrower aged 65 and five months would appear to be 65 while a borrower aged 65 and seven months would appear to be 66. The process continues to block 210 where a co-borrower birthdate is entered. If there is no co-borrower, then blocks 210 and 212 are skipped and the processor continues to block 214. If a co-borrower birthdate is entered, the processor continues to block 212 and calculates the co-borrower age.

The process continues to block 214 where the loan officer inputs the appraised property value. The process then moves to block 216 and looks up the Government Sponsored Enterprise (GSE) Limit look-up table. An exemplary GSE Limit look-up table is illustrated at FIG. 7. The process then continues to decision block 218 and asks whether the appraised value is greater than the GSE Limit. If a "no" response is given, the appraised value is not greater than the GSE Limit, the process proceeds to block 220 and sets the adjusted property value equal to appraised property value. Alternatively, if the appraised value is greater than the GSE Limit, a "yes" response in decision block 218, the process proceeds to block 222 and sets the adjusted property value equal to GSE Limit.

After either block 220 or block 222, the process proceeds to block 224 and calculates points. In a preferred embodiment of the invention, the points equal 1% of adjusted property value. The process then proceeds to block 226 and servicing fees are input. The process then continues to decision block 228 and asks whether service fees are within predefined limits. Predefined limits would be found in control files 106 of FIG. 1. If the service fees are not within the predefined limits, a "no" response in decision block 228, the process loops back to block 222 and the service fees must be reinput within the predetermined limits. Alternatively, if the service fees are within the predefined limits, a "yes" response in decision block 228, the process continues to block 230 and equity share information is entered.

Equity share is a concept whereby the borrower is allowed to receive more money than would normally be allowed, and at termination of the loan, the lender receives the balance of the loan plus an additional 10% of the value of the home. Additionally, at termination of the loan the borrower owes the lesser of the home value or the balance of the loan plus an additional 10% of the home value. In other words, if a borrower owned a home worth $100,000, and at death the loan balance was $50,000, if no equity share was provided for, the heirs would receive $50,000 upon sale of the home. However, if equity share was provided, the heirs would receive only $40,000 because the loan balance would be $50,000 and the equity share would be $10,000 (10% of the value of the home).

After block 230, the process proceeds to decision block 232 and asks whether there are two borrowers. If there are two borrowers, a "yes" response in decision block 232, the process proceeds to block 234 and proceeds to the Equivalent Single Age (ESA) look-up table. An exemplary ESA look-up table is illustrated at FIG. 6. An equivalent single age is a statistical number which generally provides that two people of particular ages have a life expectancy equivalent to a younger single person. For example, a 65 year old person has a statistical likelihood of living to be 80. However, two people both aged 65 have a likelihood that one would live, for example to age 87. Accordingly, it is likely that at least one of two people aged 65 will live as long as one person aged 57.

The process then proceeds to block 240 to look-up the Tenure Conversion Factor (TCF) from the factor look-up table. The equivalent single age is used as the age when looking up the appropriate TCF. An exemplary factor look-up table is illustrated at FIG. 5. The process next proceeds to block 242 and accesses the calculation routine of FIG. 3A. The process then proceeds to calculate servicing fee allocation. The servicing fee allocation equals the service fee divided by the Tenure Conversion Factor. The process then proceeds to block 246 and accesses the calculation routine of FIG. 3A–3B.

The process proceeds to block 248, where the origination fee and other closing costs are entered. The process again proceeds to the calculation routine of FIG. 3A–3B to recalculate all numbers. The process then proceeds to block 252, where the loan officer must enter lien advances and other draws, and to block 254 where the process again accesses the calculation routine of FIG. 3A–3B. The process then proceeds to block 256 and the loan officer enters repair set-asides. The process then proceeds to block 258 and again recalculates. The process then proceeds to block 260, where the loan officer enters the first year property charges. Then the process proceeds to block 262 and again accesses the calculation routine. From block 244 to block 262, each time the loan officer enters another charge or fee, the process recalculates all fields, and the loan amounts or values change.

The process then proceeds at block 264, and the payment plan is entered. The payment plan can be either tenure, line of credit, or modified tenure. The process then moves to decision block 270 and asks "is it tenure?" If tenure was entered, a "yes" response, the process moves to decision block 272 and asks "are there first year property charges?" If there are first year property charges, a "yes" response, the process moves to block 274 and provides an error message. Alternatively, if there are no property charges, a "no" response in decision block 272, the process proceeds to decision block 276 and asks "are there repair set-asides?" If there are repair set-asides, a "yes" response in decision block 276, the processor proceeds to block 278 and provides an error message. Alternatively, if there are no repair set-asides, a "no" response in decision block 276, the processor proceeds to block 280 and sets the net line of credit equal to zero. The processor then proceeds to decision block 282 to the calculation routine.

Alternatively, if it is not tenure, a "no" response in decision block 270, the process proceeds to decision block 284 and asks "is it line of credit?" If line of credit was entered in block 264, a "yes" response is given in decision block 284, and the process proceeds to block 286 and sets monthly payment field equal to zero. Then the process proceeds to block 288 and copies the net principal limit to the net line of credit field.

Alternatively, if a "no" answer is received in decision block 284, the processor proceeds to decision block 290 and asks "is it modified tenure?" If a "no" response is received in decision block 290, the process proceeds to block 292 and provides an error notice. This is because a "no" answer was received to all three payment plan options. Alternatively, if it is modified tenure, a "yes" response in decision block 290, the process proceeds to block 294 and requests entry of either the net line of credit or monthly payment. The process then proceeds to block 296 and accesses the calculation routine.

Figure 3A:
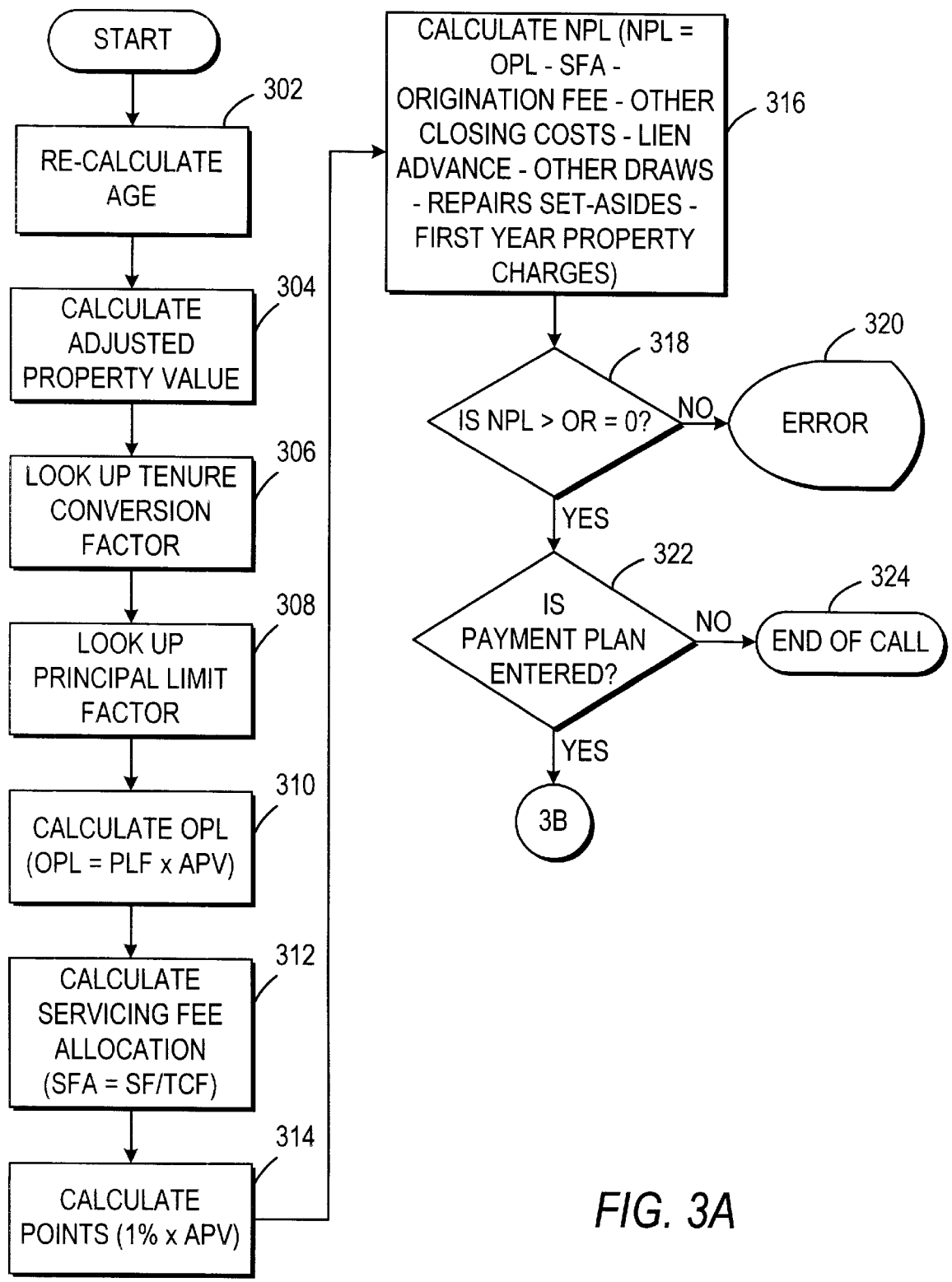
FIG. 3A–3B is a flowchart of the calculation routine of the present invention.
Figure 3B:
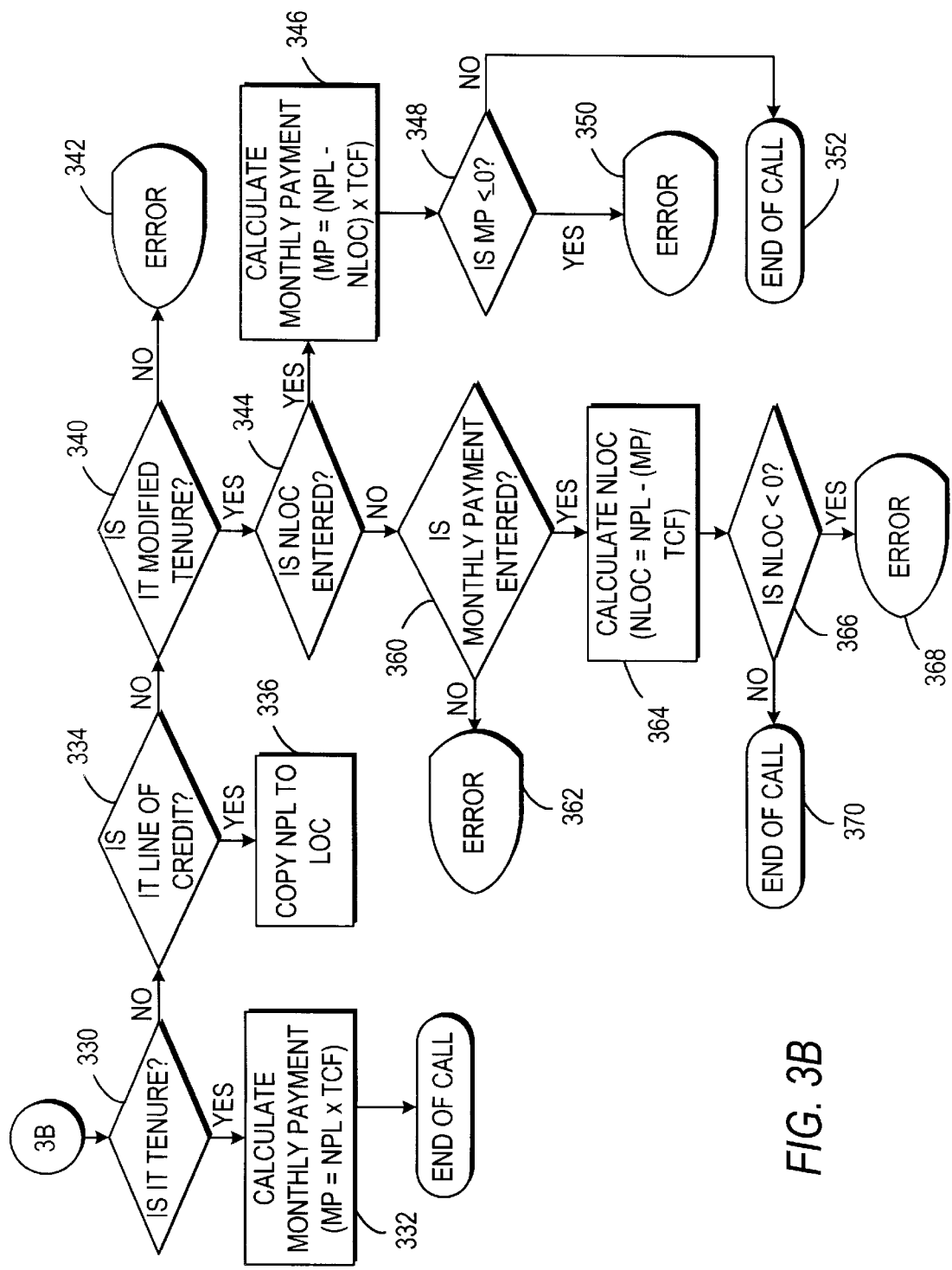

Reference is next made to FIG. 3A–3B, which illustrates the calculation routine. The calculation routine is designed to recalculate each prior calculation. Each time an entry is made or modified, the figures change to develop new loan values. The calculation routine is initiated at block 302, where the borrower age is recalculated. The age is calculated as described above in connection with block 208 of FIG. 2A. The process then proceeds to block 304 and calculates the adjusted property value (APV). The adjusted property value equals the lesser of the government sponsored enterprise (GSE) limit (found in the table provided by state at FIG. 7) and the appraised value. The process then proceeds to block 306, where a look-up of the tenure conversion factor is conducted. As discussed above, an exemplary factor look-up table is illustrated at FIG. 5. The process then proceeds to block 308 and a look-up of the principal limit factor is conducted. The principal limit factor (PLF) is also located in the factor look-up table of FIG. 5. In order to look up the PLF, the age or equivalent single age must be known, as well as whether there is equity share. The process then proceeds to block 310 and calculates the original principal limit (OPL) which equals PLF×APV. The process then proceeds to block 312 and calculates servicing fee allocation (SFA). The servicing fee allocation equals the servicing fee divided by the tenure conversion factor. The process then proceeds to block 314 and calculates points on the loan. In the exemplary embodiment, there is one point on the loan, accordingly the APV×1% equals the points.

The process next proceeds to block 316 and calculates the net principal limit (NPL). NPL equals OPL minus SFA minus origination fee minus other closing costs minus lien advance minus other draws minus set-asides minus first year property charges. In other words, the net principal limit equals the original principal limit minus essentially all fees, expenses and set asides.

The process next proceeds to decision block 318 and asks "is NPL greater than or equal to zero?" If NPL is not greater than or equal to zero, a "no" response in block 318, the process proceeds to block 320 and provides an error notice. Alternatively, if NPL is greater than or equal to zero, a "yes" response, the processor proceeds to decision block 322 and asks "is payment plan entered?" If the payment plan has not been entered, a "no" response in decision block 322, the process proceeds to block 324 and ends the call. In other words, the process returns to the position in the process flow of FIG. 2 where the calculation routine was called. Alternatively, if the payment has been entered, a "yes" response in decision block 322, the process proceeds to decision block 330 and asks "whether the payment plan is tenure?" If the payment plan is tenure, a "yes" response in decision block 330, the process proceeds to block 332 and calculates the monthly tenure payment. The monthly tenure payment equals the net principal limit multiplied by the tenure conversion factor.

Alternatively, if it is not a tenure payment, a "no" response in decision block 330, the process proceeds to decision block 334 and asks "whether it is line of credit?" If it is a line of credit payment plan, a "yes" response in decision block 334, the process proceeds to block 336 and copies the net principal limit to the line of credit field.

Alternatively, if it is not a line of credit payment plan, a "no" response in decision block 334, the process proceeds to decision block 340 and asks whether it is modified tenure?" If the payment plan is not modified tenure, a "no" response in decision block 340, the process moves to block 342 and provides an error notice. Alternatively, if it is modified tenure, a "yes" response in decision block 340 the process proceeds to decision block 344 and asks whether the net line of credit has been entered. If the net line of credit was entered, a "yes" response in decision block 344, the process proceeds to block 346 and calculates the monthly payment. The monthly payment equals the difference between the net principal limit and the net line of credit. That difference is then multiplied by the tenure conversion factor. In other words, MP=(NPL−NLOC)×TCF. The process then proceeds to decision block 348 and asks "whether the monthly payment is less than zero?" If the monthly payment is less than zero, a "yes" response in decision block 348, the process proceeds to block 350 and provides an error notice. Alternatively, if the monthly payment is greater than zero, a "no" response in decision block 348, the process proceeds to block 352 and ends the call the calculation routine.

Alternatively, if the net line of credit has not been entered, a "no" response in decision block 344, the process proceeds to decision block 360 and asks "whether the monthly payment has been entered?" If the monthly payment has not been entered, a "no" response in decision block 360, the process proceeds to block 362 and provides an error notice. On the other hand, if the monthly payment had been entered, a "yes" response in decision block 360, the process proceeds to block 364 and calculates the net line of credit. The net line of credit=NPL−(MP÷TCF). The process then proceeds to block 366 and asks "whether the net line of credit is less than zero?" If the net line of credit is less than zero, a "yes" response in decision block 366, the process proceeds to block 368 and provides an error notice. Alternatively, if the net line of credit is not less than zero, a "no" response in decision block 366, the process proceeds to block 370 and ends the call to the calculation routine.

Reference is next made to FIG. 5, which is an exemplary factor look-up table. The factor look-up table includes five fields. Each field is separated by a comma. The first field is the age field. The second field is the principal limit factor using no equity share. The third field is the principal limit factor with equity share. The fourth field is the tenure conversion factor with no equity share, and the fifth field is the tenure conversion factor with equity share. In other words, in order to look up a factor on this table, the process must have the age or equivalent single age, as well as an indication of either equity share or no equity share. In the preferred embodiment a default, for example, no equity share would be included.

Reference is next made to FIG. 6, which is an exemplary equivalent single age look-up table. The equivalent single age look-up table includes three fields. The first field is the younger borrower age and the second field is the older borrower age, and the third field is the equivalent single age of the two. For example, looking at line one of the ESA look-up table, the first borrower is age 62 and the second borrower is age 62, and the equivalent single age is 57.

Reference is next made to FIG. 7, which illustrates a GSE limit look-up table. This table includes three fields. The first field is the abbreviation for the state, the second field is the GSE limit, and the third field is the full spelling of the state. For example, at line 1, field one is AZ, field two is 203,150 and field three is Arizona. In other words, the government sponsored enterprise limit for a loan in Arizona is $203,150.

From the foregoing, it can be seen that the system and method of the present invention is designed to allow a loan officer to continuously adjust the fields and valuations for discussions with a borrower to generate the desired loan. With particular reference to FIG. 4, a loan officer would begin on line 400 by entering the borrower name. The officer would then enter the loan date and state on line 402. The officer would then enter the borrower and co-borrower birthdates if there are two borrowers, or only one birthdate if there is a single borrower. In the exemplary embodiment of FIG. 4, there is a single borrower and the birthdate is noted at 404, and the program automatically calculates the age at 406. The appraised property value is entered as $100,000 at 410 and the adjusted property value is automatically calculated at 412. In this case, the appraised property value equals the adjusted property value as described above in connection with block 304 of FIG. 3A. The adjusted property value equals the lesser of the GSE limit and appraised property value.

The loan officer then inputs the servicing fee and an indication of whether equity share is provided. The servicing fee is indicated at 414 and the indication of equity share is noted at 416. The process then looks up the tenure conversion factor which is noted at 420. Accordingly, the original principal limit noted at 422 can be calculated. Likewise, the servicing fee allocation is calculated as described in connection with block 312 of FIG. 3A. The origination fees, other closing costs, lien advances, other draws, repairs set-asides are all input by the loan officer. The points are then calculated as described for example in connection with block 314 of FIG. 3A and the first year property charges are input. With this information in place, the calculation routine automatically calculates the net principal limit as described in connection with block 316 of FIG. 3A. The payment plan is then entered and if Net Line of Credit and Tenure is entered, then the system will calculate the net line of credit or monthly payments, whichever is appropriate. Alternatively, if modified tenure is chosen, the borrower must enter either a Net Line of Credit or monthly payment amount and the system will calculate the other.

Accordingly, the screen illustrated in FIG. 4 is completed. Then, a borrower may adjust different variables to determine how the monthly payments may be increased, or line of credit may be increased. For example, by changing the equity share from yes to no, the net principal limit would increase. Additionally, if the loan were changed from one borrower to two borrowers, the age used on the factor look-up table would accordingly decrease with an equivalent single age being substituted for the borrower(s) age when the system accesses the factor look-up table and the loan value would therefore decrease. Thus, the program is designed in such a way that any of the variables may be amended, and the entire calculation routine is re-executed so that all new values are obtained.

Ultimately, as illustrated in connection with FIG. 1, once a desired loan is configured, the file can be exported as a flat file for processing and use.

Accordingly, it is a desired goal of the present invention to provide a system and method using calculation software that automatically recalculates each time variables are amended and changed, so that a loan can be customized to a user specification.

In an alternative embodiment, the system may not perform a recalculation after each piece of data is entered. The system and method may receive all the input data and wait for a calculation button to be entered before the recalculation is conducted.

It will thus be seen that the objects set forth above, among those made apparent from the preceding description, are efficiently obtained and, since certain changes may be made in the system or in carrying out the above process without departing from the spirit and scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A process for calculating monetary payments by a lender to a borrower based on the value of an asset using at least one of a plurality of constants stored in look-up tables, comprising the steps of:

a. inputting borrower specific information including at least one of borrower birthdate and borrower age, and if there are two borrowers, inputting at least one of co-borrower birthdate and co-borrower age;

b. calculating borrower age and co-borrower age if borrower birthdate and co-borrower birthdate are input;

c. inputting property specific information including property value;

d. inputting equity share information;

e. if there are co-borrowers, looking-up equivalent single age from a first look-up table;

f. looking-up tenure conversion factor from a second look-up table;

g. inputting loan type as one of tenure, line of credit, and modified tenure;

h. if tenure, then setting net line of credit equal to zero, if line of credit, then setting monthly payment equal to zero, and if modified tenure, then setting one of net line of credit and monthly payment to borrower desired amount;

i. looking-up principal limit factor from a third look-up table;

j. calculating original principal limit equals principal limit factor multiplied by property value;

k. calculating net principal limit equals original principal limit minus costs; and l. if tenure, then calculating monthly payment equals net principal limit times tenure conversion factor, if line of credit, then copying net principal limit to line of credit, and if modified tenure, then calculating one of net line of credit equals net principal limit minus (monthly payment divided by tenure conversion factor) when monthly payment entered in step h, and monthly payment equals (net principal limit minus net line of credit) multiplied by tenure conversion factor when net line of credit entered in step h.

2. The process of claim 1 further including the step of inputting the state in which the loan is being applied.

3. The process of claim 2 further including the step of looking-up the GSE limit from a forth look-up table.

4. The process of claim 3 wherein the GSE limit is determined based on the state of the loan.

5. The process of claim 4 wherein the property value input in step c is the appraised property value.

6. The process of claim 5 further including the step of setting the adjusted property value equal to the lesser of the appraised property value and the GSE limit.

7. The process of claim 1 wherein the tenure conversion factor from the second look-up table is based on the age data and equity share information.

8. The process of claim 1 wherein the principal limit factor from the second look-up table is based on the age data and equity share information.

9. The process of claim 1 wherein borrower age equals the loan date minus the borrower birthdate.

10. The process of claim 1 further including the steps of inputting the servicing fees and calculating the servicing fee allocation.

11. The process of claim 10 wherein the servicing fee allocation equals the servicing fee divided by the tenure conversion factor.

12. The process of claim 1 wherein all calculations are recalculated each time a variable is changed.

13. The process of claim 1 wherein calculations are made upon request by a user.

14. A system for calculating monetary payments by a lender to a borrower based on the value of an asset using at least one of a plurality of constants stored in look-up tables, comprising:

means for inputting borrower specific information including at least one of borrower birthdate and borrower age, and if there are two borrowers, inputting at least one of co-borrower birthdate and co-borrower age;

means for calculating borrower age and co-borrower age if borrower birthdate and co-borrower birthdate are input;

means for inputting property specific information including property value;

means for inputting equity share information;

means for looking-up equivalent single age from a first look-up table, if there are co-borrowers;

means for looking-up tenure conversion factor from a second look-up table;

means for inputting loan type as one of tenure and line of credit;

means for looking-up principal limit factor from a third look-up table;

means for calculating original principal limit as principal limit factor multiplied by property value;

means for calculating net principal limit as original principal limit minus costs; and means for calculating loan value, wherein if tenure, then calculating monthly payment equals net principal limit times tenure conversion factor, if line of credit, then copying net principal limit to line of credit.

15. The system of claim 14 further including means for inputting the state in which the loan is being applied.

16. The system of claim 15 further including means for looking-up the GSE limit from a forth look-up table.

17. The system of claim 16 wherein the GSE limit is determined based on the state of the loan.

18. The system of claim 17 wherein the property value is the appraised property value.

19. The system of claim 18 further including means for setting the adjusted property value equal to the lesser of the appraised property value and the GSE limit.

20. The system of claim 14 wherein the tenure conversion factor from the second look-up table is based on the age data and equity share information.

21. The system of claim 14 wherein the principal limit factor from the second look-up table is based on the age data and equity share information.

22. The system of claim 14 wherein borrower age equals the loan date minus the borrower birthdate.

23. The system of claim 14 further including means for inputting the servicing fees and calculating the servicing fee allocation.

24. The system of claim 23 wherein the servicing fee allocation equals the servicing fee divided by the tenure conversion factor.

25. The system of claim 24 wherein all calculations are recalculated each time a variable is changed.

26. The system of claim 24 wherein calculations are made upon request by a user.

27. A process for calculating monetary payments by a lender to a borrower based on the value of an asset using at least one of a plurality of constants stored in look-up tables, comprising the steps of:

a. inputting borrower specific information including indicia of borrower age;

b. inputting property specific information including property value;

c. inputting equity share information;

d. looking-up tenure conversion factor from a first look-up table;

e. inputting loan type as one of tenure, line of credit, and modified tenure;

f. if tenure, then setting net line of credit equal to zero, if line of credit, then setting monthly payment equal to zero, and if modified tenure, then setting one of net line of credit and monthly payment to borrower desired amount, g. looking-up principal limit factor from a second look-up table;

h. calculating original principal limit equals principal limit factor multiplied by property value;

i. calculating net principal limit equals original principal limit minus costs; and j. if tenure, then calculating monthly payment equals net principal limit times tenure conversion factor, if line of credit, then copying net principal limit to line of credit, and if modified tenure, then calculating one of net line of credit equals net principal limit minus (monthly payment divided by tenure conversion factor) when monthly payment entered in step f, and monthly payment equals (net principal limit minus net line of credit) multiplied by tenure conversion factor when net line of credit entered in step f.

28. The process of claim 27 further including the step of inputting the state in which the loan is being applied.

29. The process of claim 28 further including the step of looking-up the GSE limit from a third look-up table.

30. The process of claim 29 wherein the GSE limit is determined based on the state of the loan.

31. The process of claim 30 wherein the property value input in step b is the appraised property value.

32. The process of claim 31 further including the step of setting the adjusted property value equal to the lesser of the appraised property value and the GSE limit.

33. The process of claim 27 wherein the tenure conversion factor from the first look-up table is based on the indicia of borrower age and equity share information.

34. The process of claim 27 wherein the principal limit factor from the first look-up table is based on the indicia of borrower age and equity share information.

35. The process of claim 27 wherein borrower age equals the loan date minus the borrower birthdate.

36. The process of claim 27 further including the steps of inputting the servicing fees and calculating the servicing fee allocation.

37. The process of claim 36 wherein the servicing fee allocation equals the servicing fee divided by the tenure conversion factor.

38. The process of claim 27 wherein all calculations are recalculated each time a variable is changed.

39. A system for calculating monetary payments by a lender to a borrower based on the value of an asset using at least one of a plurality of constants stored in look-up tables, comprising:

means for inputting borrower specific information including indicia of borrower age;

means for inputting property specific information including property value;

means for inputting equity share information;

means for looking-up tenure conversion factor from a first look-up table;

means for inputting loan type as one of tenure, line of credit, and modified tenure;

means for setting net line of credit equal to zero for tenure loan, for setting monthly payment equal to zero for line of credit loan, and for setting one of net line of credit and monthly payment to borrower desired amount for modified tenure loan;

means for looking-up principal limit factor from a second look-up table;

means for calculating original principal limit as principal limit factor multiplied by property value;

means for calculating net principal limit as original principal limit minus costs; and means for calculating monthly payment as net principal limit times tenure conversion factor for tenure loan, for copying net principal limit to line of credit for line of credit loan, and for calculating one of net line of credit equals net principal limit minus (monthly payment divided by tenure conversion factor) when monthly payment is entered as a constant and monthly payment equals (net principal limit minus net line of credit) multiplied by tenure conversion factor when net line of credit is entered as a constant for a modified tenure loan.

40. The system of claim 39 further including means for inputting the state in which the loan is being applied.

41. The system of claim 40 further including means for looking-up the GSE limit from a third look-up table.

42. The system of claim 41 wherein the GSE limit is determined based on the state of the loan.

43. The system of claim 42 wherein the property value input is the appraised property value.

44. The system of claim 43 further including means for setting the adjusted property value equal to the lesser of the appraised property value and the GSE limit.

45. The system of claim 39 wherein the tenure conversion factor from the first look-up table is based on the age data and equity share information.

46. The system of claim 39 wherein the principal limit factor from the first look-up table is based on the age data and equity share information.

47. The system of claim 39 wherein borrower age equals the loan date minus the borrower birthdate.

48. The system of claim 39 further including the steps of inputting the servicing fees and calculating the servicing fee allocation.

49. The system of claim 48 wherein the servicing fee allocation equals the servicing fee divided by the tenure conversion factor.

50. The system of claim 39 wherein all calculations are recalculated each time a variable is changed.

* * * * *